United States Patent
Suetsugu et al.

(10) Patent No.: US 7,073,124 B1
(45) Date of Patent: Jul. 4, 2006

(54) DISPLAY DRAFTING APPARATUS AND SYSTEM THEREFOR

(75) Inventors: Nobuhiro Suetsugu, Tokyo (JP); Masayuki Maeda, Tokyo (JP); Michiaki Isobe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 595 days.

(21) Appl. No.: 09/680,419

(22) Filed: Oct. 6, 2000

(30) Foreign Application Priority Data

Apr. 3, 2000 (JP) .............................. 2000-100989

(51) Int. Cl.
*G06F 3/00* (2006.01)
(52) U.S. Cl. ...................... 715/700; 715/771; 715/969
(58) Field of Classification Search ............... 345/700, 345/771, 441–443, 964, 734, 736, 738, 853, 345/969; 700/17, 83; 715/771, 734, 736, 715/738, 853, 969
See application file for complete search history.

(56) References Cited

U.S. PATENT DOCUMENTS

| | | | | |
|---|---|---|---|---|
| 5,548,707 | A * | 8/1996 | LoNegro et al. | 715/502 |
| 5,819,042 | A * | 10/1998 | Hansen | 709/222 |
| 5,999,213 | A * | 12/1999 | Tsushima et al. | 348/180 |
| 6,232,985 | B1 * | 5/2001 | Chase et al. | 345/441 |
| 6,256,595 | B1 * | 7/2001 | Schwalb et al. | 703/1 |
| 6,674,955 | B1 * | 1/2004 | Matsui et al. | 386/52 |

FOREIGN PATENT DOCUMENTS

| | | |
|---|---|---|
| JP | 08-263245 A | 10/1996 |
| JP | 11-175326 | 7/1999 |
| JP | 11-175326 A | 7/1999 |

OTHER PUBLICATIONS

Rockwell Software Catalog, "RSView32 Software" www.ab.com/catalogs/b113/oi/rsview.html, no date.
Beijers Catalog "More opportunities to create rational solutions with a PC" www.beijer.no/engelsk/products/02/03_01/htm, no date.

* cited by examiner

*Primary Examiner*—Weilun Lo
*Assistant Examiner*—Nhon (Gary) D. Nguyen
(74) *Attorney, Agent, or Firm*—Sughrue Mion, PLLC

(57) ABSTRACT

When the drafting operation with a display drafting apparatus and the generating operation with a control program schema generator proceed concurrently or separately, a step of temporarily storing the device of interest for display can be omitted to enhance the drafting efficiency. Conventionally, drafting the display was conducted in such a way as to temporarily store (memorize, or store with the file) a device of a controller for use, set up the specifications of the display at steps of selecting a display component, selecting display mode and function, and then call back the temporarily stored device to perform the operation of selecting the device symbol and number. This invention starts with the selection of a desired device, as such, there is no need of the temporary storage, resulting in enhanced drafting efficiency.

8 Claims, 18 Drawing Sheets

| DEVICE SYMBOL | → | Y | |
|---|---|---|---|
| DEVICE NUMBER | → | 3 | |
| DISPLAY POSITION X COORDINATE | → | 1 2 3 | |
| DISPLAY POSITION Y COORDINATE | → | 2 3 4 | |
| KIND OF DISPLAY COMPONENT | → | HUNG UP : FFFFh | ~40: MEMORY |
| DISPLAY MODE | → | HUNG UP : FFFFh | ~41: MEMORY |
| DISPLAY FUNCTION | → | HUNG UP : FFFFh | ~42: MEMORY |

DISPLAY DRAFTING APPARATUS AND SYSTEM THEREFOR

BACKGROUND OF THE INVENTION

This invention relates to a display for indicating the operated condition of a controller which coordinates and controls the operation of the controlled system such as the industrial equipment, the production line or the chemical plant, and an apparatus for generating the contents of display.

There has been widely used a controller referred to as a programmable controller for coordinating and controlling the operation of the controlled system such as the industrial equipment, the plant production line and the chemical plant. This controller holds the signal and data of the controlled system and classifies it into an input signal, an output signal, an auxiliary signal, a count value, a timer value, and numerical data in accordance with the kind of signal or data. For example, the on/off signal indicating the opening or closing of a switch or a valve is an input signal or an output signal. The number of products is a count value, the clock value for clocking the operation timing of the machine is a timer value and the temperature or pressure is numerical data.

Such signals and data are stored in a memory referred to as a device within the controller (hereinafter generically called a device), wherein the controller coordinates and controls the operation of the device in accordance with the contents of a control program schema.

Herein, the control program schema is a program which is also held in a memory within the controller to provide the specified operation of the controlled system, and is created using a control program schema generator by the control designer. Herein, the programming language for use may be a Relay Ladder which is well known and widely used.

FIG. 22 illustrates a user operation screen of the control program schema generator. The device is assigned with a device symbol for discriminating the kind of signal or data. In FIG. 22, an input signal 120 is designated by X, an output signal 121 by Y, an auxiliary signal 122 by M, a count value 123 by C, a timer value 124 by T, and numerical data 125 by D. Further, to distinguish a plurality of signals for a certain device symbol, the number called as a device number is given following the device symbol.

Reference numeral 51 denotes means for entering a sequence circuit symbol into the control program schema, wherein on depressing a desired one of the buttons 511, 512, 513 and 514 having the title of circuit symbol for Relay Ladder, device selecting means 126 for setting up the device symbol and the device number will subsequently appear, as shown in FIG. 23. On depressing an OK button 129, the device selecting means 126 accepts the set-up contents from selecting means 127 for the device symbol and selecting means 128 for the device number, and then is closed.

A display will be described below. To inform the device values of the controller to the operator who is on the production line, a display or a display unit referred to as a programmable display is widely used. The display has not only a display screen such as a CRT or liquid crystal display on which the device data is displayed, but also has input means such as a touch panel to allow the operator to enter a start command of the machine or an operation command for setting up the number of products into the display to pass it to the controller.

The contents of display appearing on the display screen are varied in accordance with the specifications of the controlled system, and created by the screen designer, using a display drafting apparatus with the basic constitution as shown in FIG. 19. This design operation of the display contents is broadly called as drafting.

The display drafting apparatus will be described below. A user operation screen of the display drafting apparatus has a drafting area 1 on the display screen and display component selecting means 2 for selecting a display component which is a constituent of the display contents, as shown in FIG. 20.

The display components typically include a lamp component 21 having a lamp mode particularly indicating the on/off of the device, a numerical value component 22 directly indicating the numerical value of the device, a meter component 23 and a graphic component 24 having a meter or graph mode for graphically indicating the numerical values, a character string component 25 for conveying a message to the operator in accordance with the device data, and a touch key component 26 for entering an input signal from a touch panel into the display, the display component selecting means 2 being provided with the buttons for selecting them.

Further, the display component selected is required to have some attributes set up in respect of the display, such as which device value to indicate, the detail mode for the shape or color of the display component, or the additional functions fulfilled on the display. It is an operation screen of FIG. 21 that is opened by depressing each display component button constituting the display component selecting means 2, and on this operation screen, there are provided device selecting means 110 for providing the attribute of the display component, display mode selecting means 113, and display function selecting means 114. The device selecting means 110 is further constituted of device symbol selecting means 111 and device number selecting means 112. In FIG. 21, this operation screen can be opened particularly by depressing a touch key component button 26 in FIG. 20.

FIG. 24 shows a procedure for proceeding with the drafting by a conventional display drafting apparatus. In FIG. 24, this procedures starts from step ST30 of selecting the display component by the display component selecting means 2 as shown in FIG. 20, and then continues to step ST31 of arranging the selected display component at a predetermined position in the drafting area, to steps ST5 and ST6 of setting up the display mode or display function of the display component arranged, and to a device selecting step ST1 of selecting which device data to display for the arranged display component. The device selecting step ST1 can be divided into a step ST11 of selecting the device symbol and a step ST12 of selecting the device number. Herein, the steps subsequent from the step ST30 of selecting the display component do not necessarily occur in the order as shown in FIG. 24, but the step ST30 of selecting the display component should exist at the beginning of flowchart of FIG. 24.

In this way, the procedure of FIG. 24 which starts drafting from the step of selecting the display component is natural, considering that the determination of which component is to display on the display screen is the first operation in drafting, and is very effective in the cases where the drafting procedure of apparently designing the screen at first, and then setting up the device value for display to each component is followed.

However, the above drafting procedure, which only takes the drafting into consideration, is particularly a design procedure to be taken when the control designer creating a control program also works as the screen designer, resulting in a problem that this procedure is unsuitable in the cases where the designer performs the drafting concurrently while making the control program.

In this case, the control and screen designer (hereinafter simply referred to as a designer) will begin to contemplate which operation of a certain device the controller coordinates and controls and how to indicate it on the display.

If the conventional display drafting apparatus is used in accordance with such a design procedure which begins with taking notice of a certain device, it is required to perform a device temporary memorizing step ST40 of once memorizing this device in the designer's head, or noting it down on another draft or memo at the time of paying attention to the certain device, as shown in FIG. 25.

Thereafter, the drafting work is conducted from a step of selecting the display component as in FIG. 24, but if a device selecting step ST1 is reached, it is required to proceed through a temporary memory calling back step ST41 of calling back the device memorized at the device temporary memorizing step ST40 to the steps ST11 and ST12 of assigning the device symbol and the device number in FIG. 25.

In this way, the temporary memorizing step ST40 for the device of notice may take a trouble of noting down the device on another drawing or something, if it is actually noted down, and the temporary memory calling back step ST41 may also take a trouble of having to see the draft on which a temporary memo has been made, resulting in lower operation efficiency in view of the control program design and the overall drafting design, because the things memorized in the head may be forgotten.

In the process where the control program design and the drafting are separately performed, there was a problem with the conventional display drafting apparatus that the drafting operation as shown in FIG. 24 can not be started at the stage where the mode of the display component, that is, the apparent specification of the screen has not been particularly determined.

This is because the display component selecting means 2 of FIG. 20 presupposes that the mode of the display component is provided, for example, when the numerical data is displayed within the device in FIG. 20, it is impossible to perform the selection step ST30 of the display component which is the first step of FIG. 24, unless it is determined whether this is in the numerical value mode, the meter mode or the graphical mode.

In practice, even at the stage where the control specifications of the controller are first embodied, the control program is completed, and it is determined which device data is displayed on the display, the mode of each display component for the display may often have not been determined in some cases. In such cases, the drafting operation of the display may be hung up from the first stage.

Further, it is required that the device to be displayed is also input into the control program schema generator to allow the operation to be coordinated and controlled, but the control program schema generator may include device setting means such as the device selecting means 126 as shown in FIG. 23, for example. Since this means is separate from the device setting means 110 for the display drafting apparatus of FIG. 21, there was a problem that the designer must input at both the display drafting apparatus and the control program schema generator to set up the same device, and master two operations for both. Also, the device may have a comment for explanation of its role appended thereto, and setting this comment must be made with the control program schema generator and the display drafting apparatus, which would cause the same problem.

SUMMARY OF THE INVENTION

This invention has been achieved to resolve the above-mentioned problems and it is an object of this invention to provide a display drafting apparatus having the enhanced drafting efficiency by omitting the step of temporarily storing a device of notice, when proceeding with the program design and the drafting concurrently.

It is another object of the invention to provide a display drafting apparatus having the enhanced efficiency of drafting operation by starting the drafting operation with the step of assigning the device put forward in the cases where the control program design and the drafting are separately performed, as far as the device has been determined even at the stage where the display component of the display has not been determined.

It is a further object of the invention to provide a display drafting apparatus in which a device selected by device selecting means can be also used as the selected device for a control program schema generator so that the control program design can be made more efficient.

Further, it is another object of the invention to provide a display drafting apparatus with means for appending a comment to the selected device, in which this comment is also utilized for a control program schema generator to make the control program design more efficient.

Further, it is another object of the invention to provide a display drafting apparatus having control program schema generating means in which the selected device and the created comment can be shared between them with a simple structure.

Further, it is another object of the invention to provide a display drafting system which easily allows for the connection between a controller and a display, and the transfer operation, by transferring the drafting data and the control program data created by a display drafting apparatus having control program schema generating means to the display and the controller efficiently.

(1) A display drafting apparatus according to aspect 1 of the invention comprises means for selecting a device of a controller for use and means for setting up the display drafting information such as a display component, a display mode, and a display function for the selected device, wherein said display drafting apparatus drafts a display.

(2) The display drafting apparatus according to aspect 2 of the invention comprises means for saving only device selection information for the controller selected and created by the device selecting means, wherein the device selection information can be saved even if the selected device is a device for which the display drafting information has not been set up.

(3) The display drafting apparatus according to aspect 3 of the invention additionally has the function of a control program schema generator for the controller within the display drafting apparatus, and comprises means for allowing the device selection information for the controller selected and created by the device selecting means to be utilized with said control program schema generator.

(4) The display drafting apparatus according to aspect 4 of the invention comprises means for appending a comment to the device for the controller selected by the device selecting means, and means for allowing the appended comment to be shared between the display drafting apparatus and the control program schema generator.

(5) The display drafting apparatus according to aspect 5 of the invention comprises control program schema generating means for the controller, and means for allowing the use of the device selection information for the controller selected and created by the device selecting means, when a program schema is generated by the program schema generating means.

(6) A display drafting system according to aspect 6 of the invention has the display drafting apparatus according to aspect 5, a display and a controller which are connected via a communication line, wherein in the cases where said system is connected in series in the order of the display drafting apparatus, the display and the controller via the communication line, there is provided transfer means for transferring the drafting data among the drafting data created by said display drafting apparatus and the control program data to the display, and transferring the control program data via said display to said controller, while in the cases where said system is connected in series in the order of said display drafting apparatus, the controller and the display via the communication line, there is provided transfer means for transferring the control program data among the drafting data created by said display drafting apparatus and the control program data to the controller, and transferring the drafting data via said controller to said display.

DETAILED DESCRIPTION OF THE PREFERRED EMBODIMENTS

Figure 1:
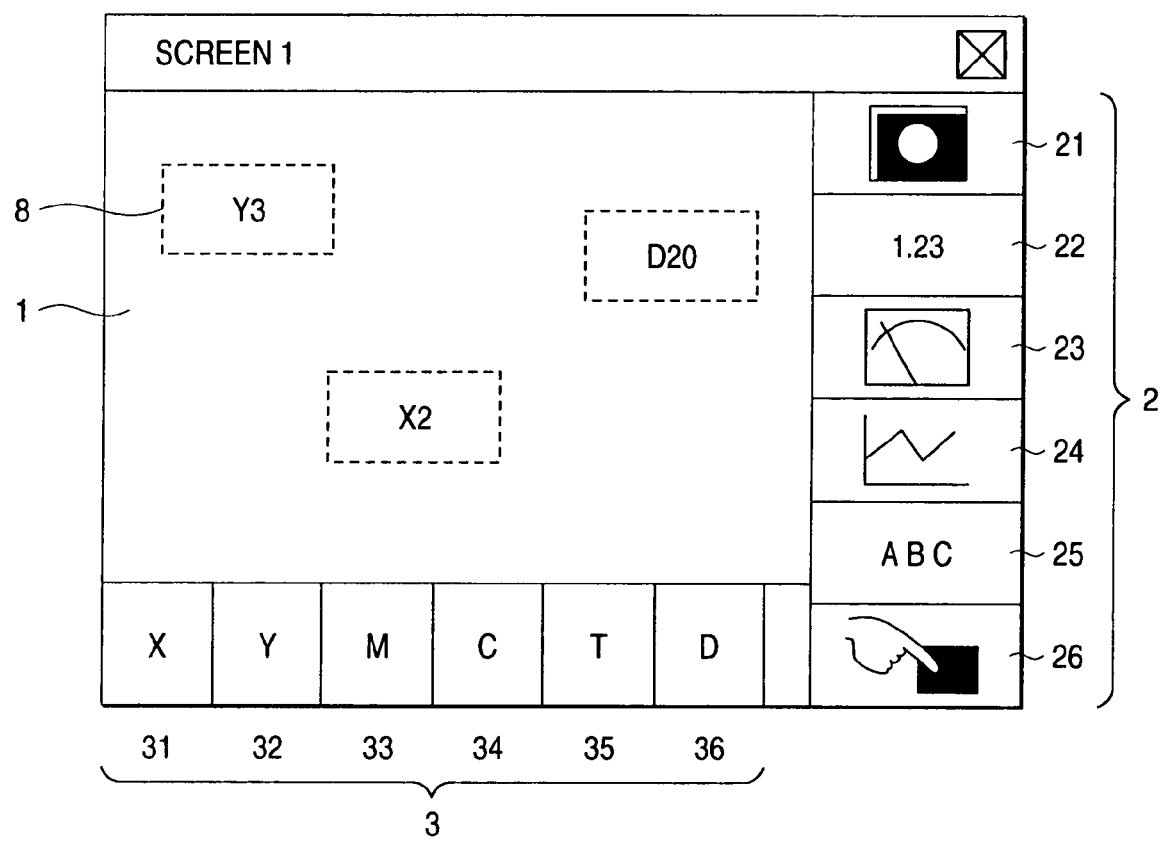
FIG. 1 is a view showing an operation screen of a display drafting apparatus according to an embodiment 1 of this invention.

The embodiments of this invention will be described below. FIG. 1 shows a user operation screen of a display drafting apparatus according to the present invention, which is provided to the user by a display unit 100 with the basic configuration of FIG. 19.

Before explaining FIG. 1, the basic configuration of FIG. 19 will be described below.

Figure 19:
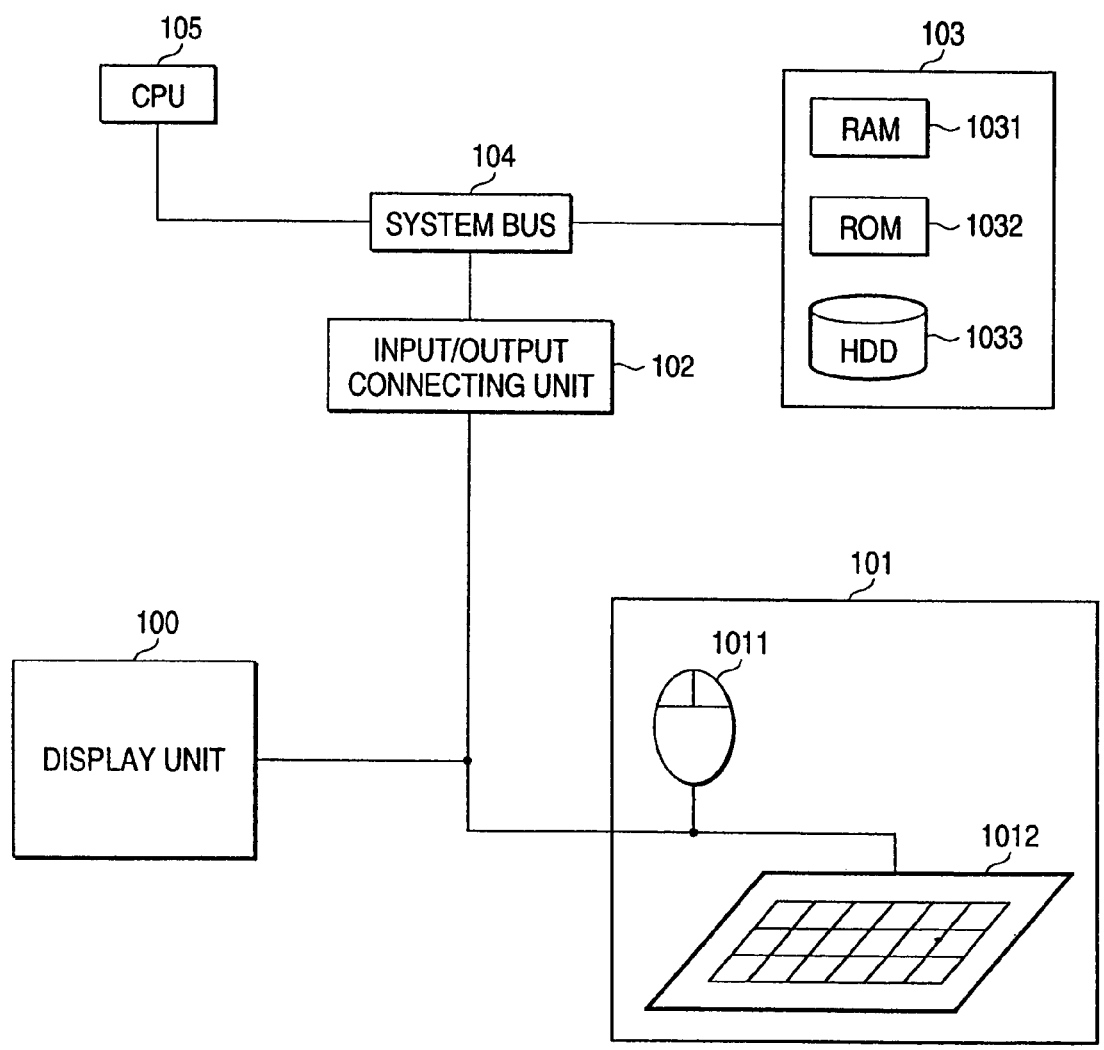
FIG. 19 is a basic block diagram of the display drafting apparatus according to all the embodiments of this invention.

In FIG. 19, reference numeral 100 denotes a display unit for displaying the user operation screen via a graphical user interface, and reference numeral 101 denotes an input unit which is comprised of a mouse 1011 for manipulating the graphical user interface, and a keyboard 1012. Reference numeral 102 denotes an input/output connecting unit for connecting the display unit 100 and the input unit 101 to a system bus 104, and reference numeral 103 denotes a storage unit which is comprised of a random access memory (RAM) 1031 for storing the data of a screen for the graphical user interface, or the data of displayed contents that have been drafted during operation, a read-only memory (ROM) 1032 for storing a basic OS (Operating System) of the present apparatus, and a hard disk (HDD) 1033 for saving the data of displayed contents that have been drafted with a file.

Reference numeral 104 denotes the system bus for use to send and receive the data between the display unit 100, the input unit 101, the input/output connecting unit 102, the storage unit 103 and a CPU (Central Processing Unit) 105. This CPU 105 controls the operation of the display unit 100, the input/output connecting unit 102, the storage unit 103, and the system bus 104, and the process of the graphical user interface.

Such a basic configuration is the same as that of the general purpose computer such as a work station or a personal computer, wherein the general purpose computer can be utilized to implement the basic configuration of the display drafting apparatus according to the present invention. In this case, a program for processing the overall display drafting apparatus according to the present invention is installed as software in the storage unit 103 and processed by the CPU 105.

Embodiment 1

The user operation screen of the present invention will be described below with reference to FIG. 1.

Figure 20:
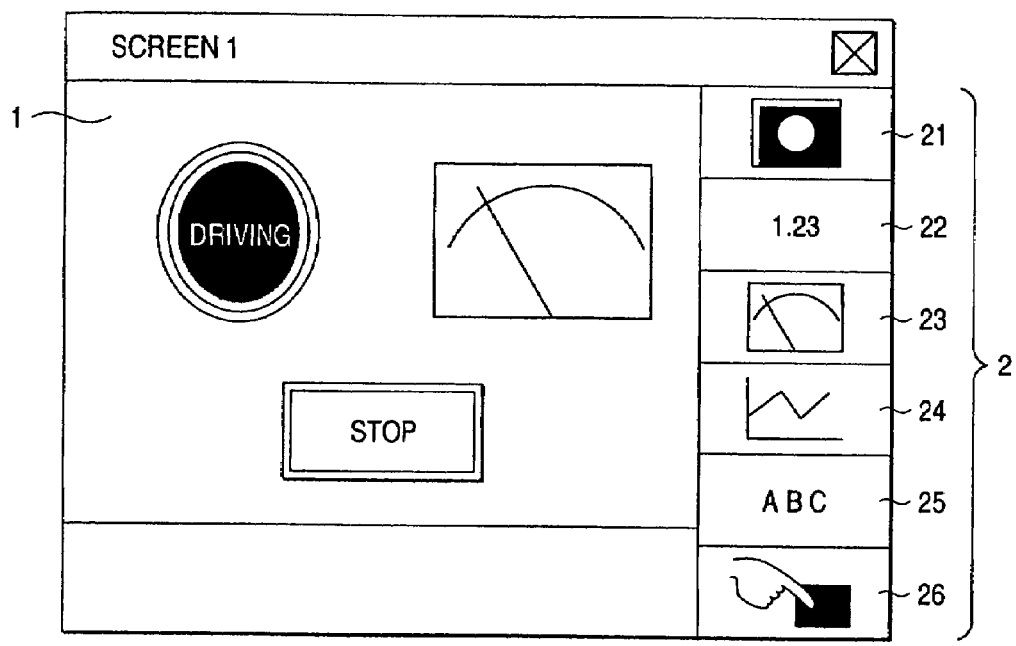
FIG. 20 is a diagram showing an operation screen of the conventional display drafting apparatus.

In FIG. 1, there are provided a screen 1 for presenting the display screen, and display component selecting means 2, the display components consisting of a lamp component 21, a numerical value component 22, a meter component 23, a graphical component 24, a character string component 25, and a touch key component 26, like the user operation screen of the conventional display drafting apparatus as shown in FIG. 20.

In FIG. 1, device selecting means 3 consisting of an input X button 31, an output Y button 32, an auxiliary signal M button 33, a counter value C button 34, a timer value T button 35, and a numerical value data D button 36 for each device are further provided. They should be visually shown directly to the user to easily understand the kind of device, device selecting means 3 having the buttons with the title of device symbol. In addition to the buttons, a menu which displays a list of device symbols may be provided.

Figure 2:
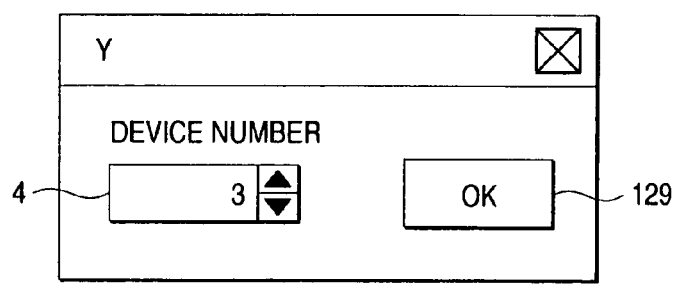
FIG. 2 is a view showing another operation screen of the display drafting apparatus according to the embodiment 1 of this invention.

Further, device number selecting means 4 of FIG. 2 is provided to supplement the function of device selecting means 3, and is displayed subsequent to the selection of the device symbol which is made by depressing each button.

Figure 24:
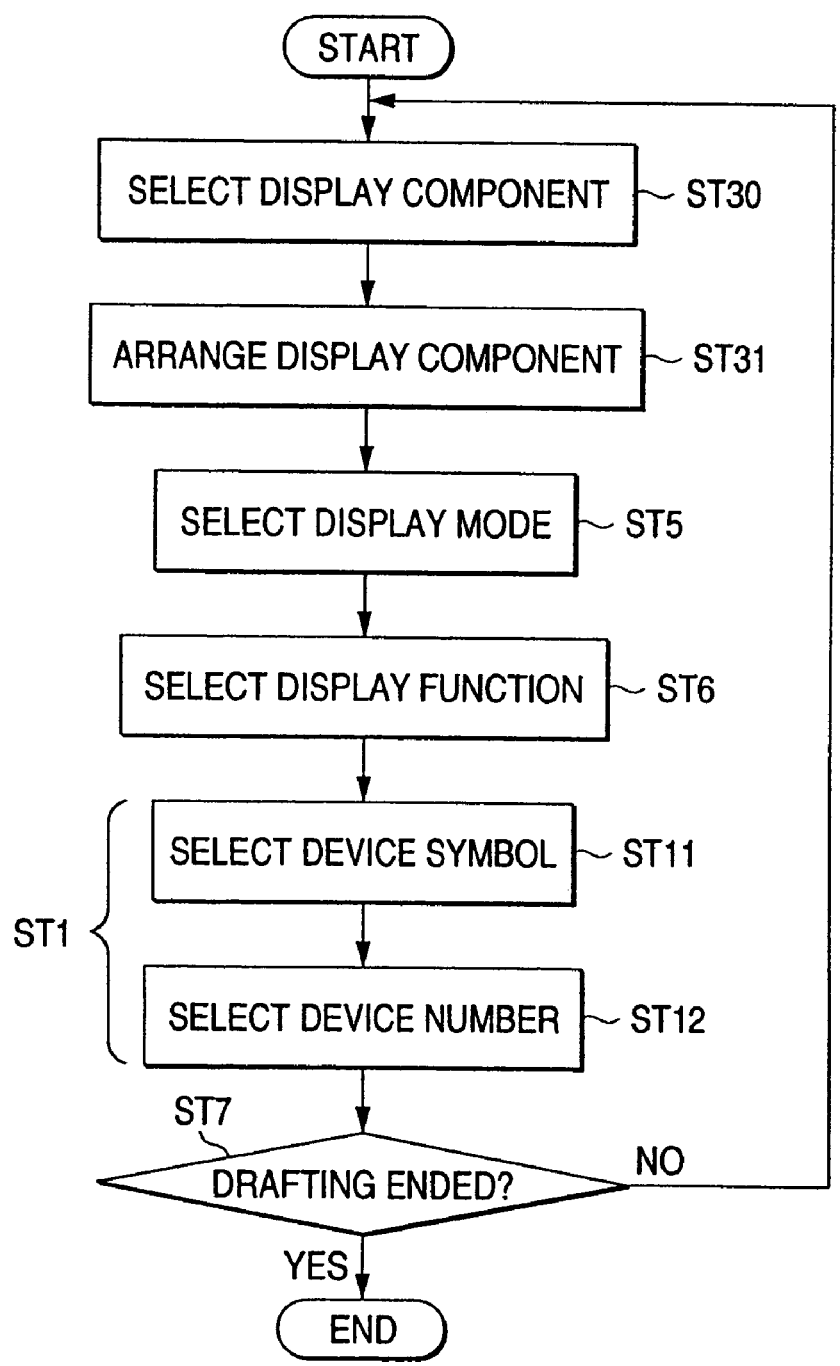
FIG. 24 is a flowchart showing an operation procedure of drafting in the conventional display drafting apparatus.
Figure 25:
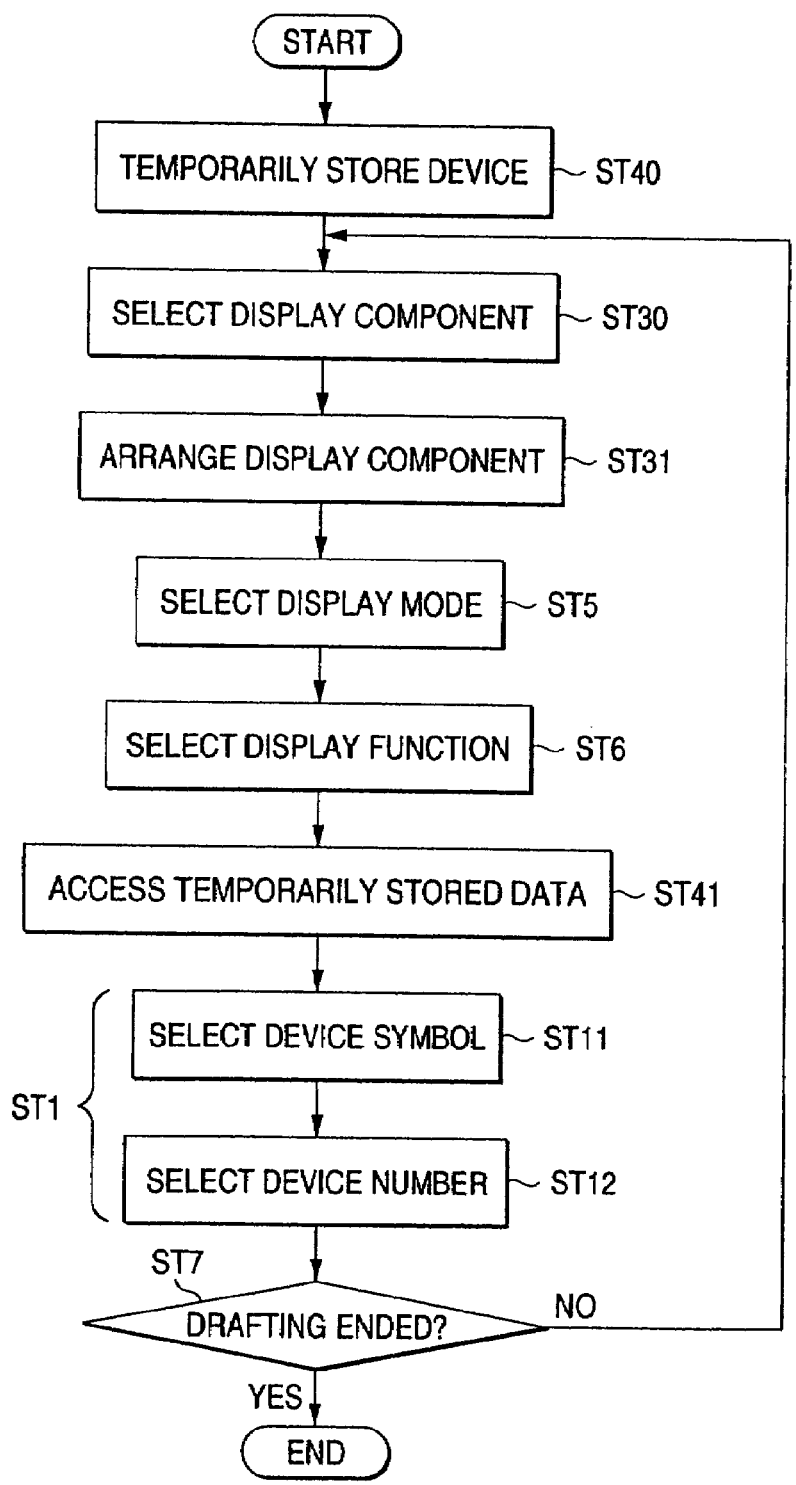
FIG. 25 is a flowchart showing an operation procedure when proceeding with the conventional control program design and the drafting concurrently.

Also in FIG. 1, like FIG. 20, when the user or designer of the present apparatus selects a display component by the display component selecting means 2, an attribute setting screen of the display component in FIG. 21 will appear subsequently so that the user can proceed with the drafting in accordance with the same procedure as the flowchart of FIG. 24.

Figure 3:
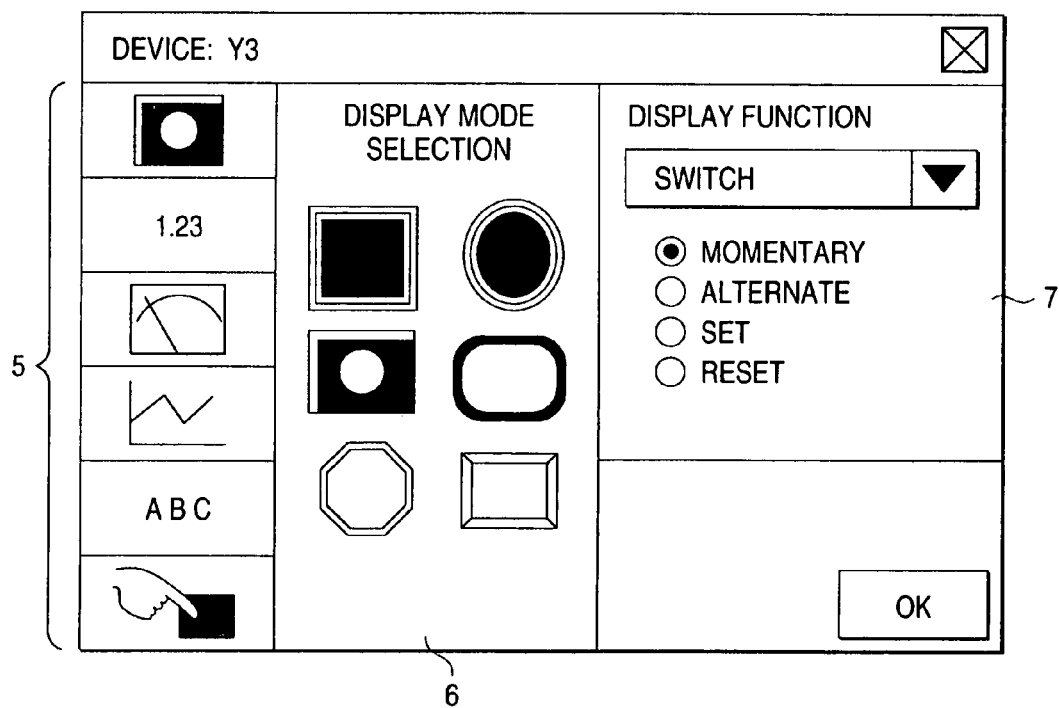
FIG. 3 is a view showing another operation screen of the display drafting apparatus according to the embodiment 1 of this invention.

On the contrary, FIG. 3 shows an attribute setting screen of display component which will appear after the user has selected a device by the device selecting means 3 and FIG. 2, this attribute setting screen being useful to provide the kind of display component, the display mode, and the display function for the selected device afterwards.

Figure 21:
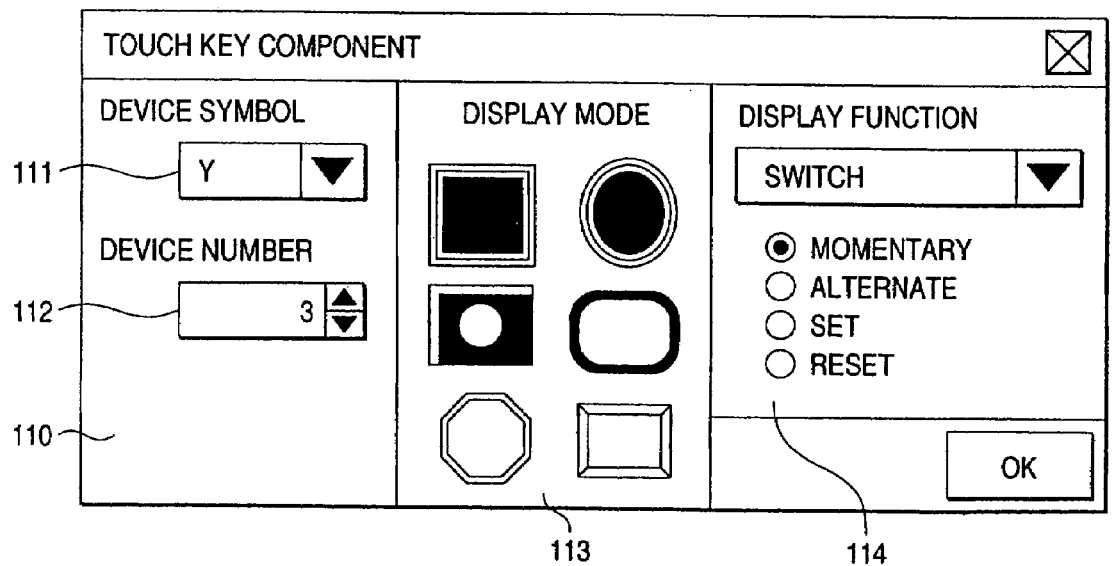
FIG. 21 is a diagram showing another operation screen of the conventional display drafting apparatus.
Figure 22:
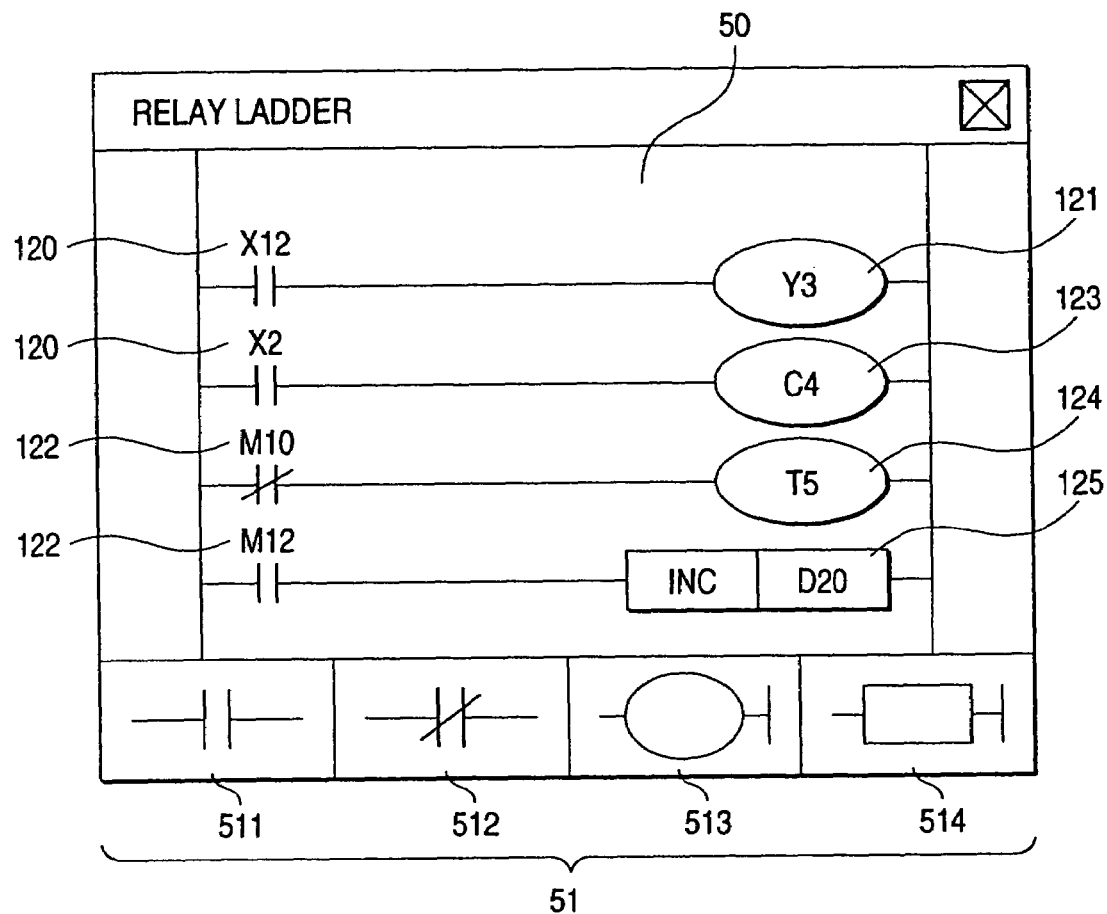
FIG. 22 is a diagram showing an operation screen of the conventional control program schema generator.
Figure 23:
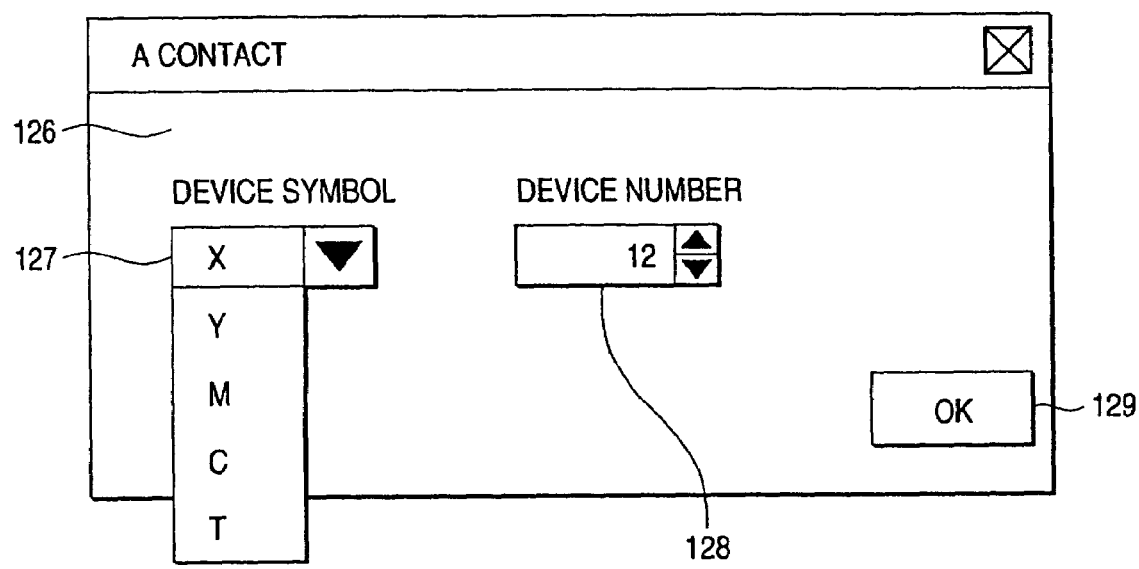
FIG. 23 is a diagram showing another operation screen of the conventional control program schema generator.

Each of these selecting means is referred to as second display component selecting means 5, second display mode selecting means 6 and second display function selecting means 7, respectively, to distinguish them from the display component selecting means 2 of FIG. 1 or FIG. 20 which shows the conventional selecting means, the display mode selecting means 113 and the display function selecting means 114 of FIG. 21. FIG. 3 shows an instance in which a touch key component has been selected specifically, like FIG. 21. An operation procedure of drafting in terms of such means which are the features of the present invention will be described below with reference to FIG. 4.

Figure 4:
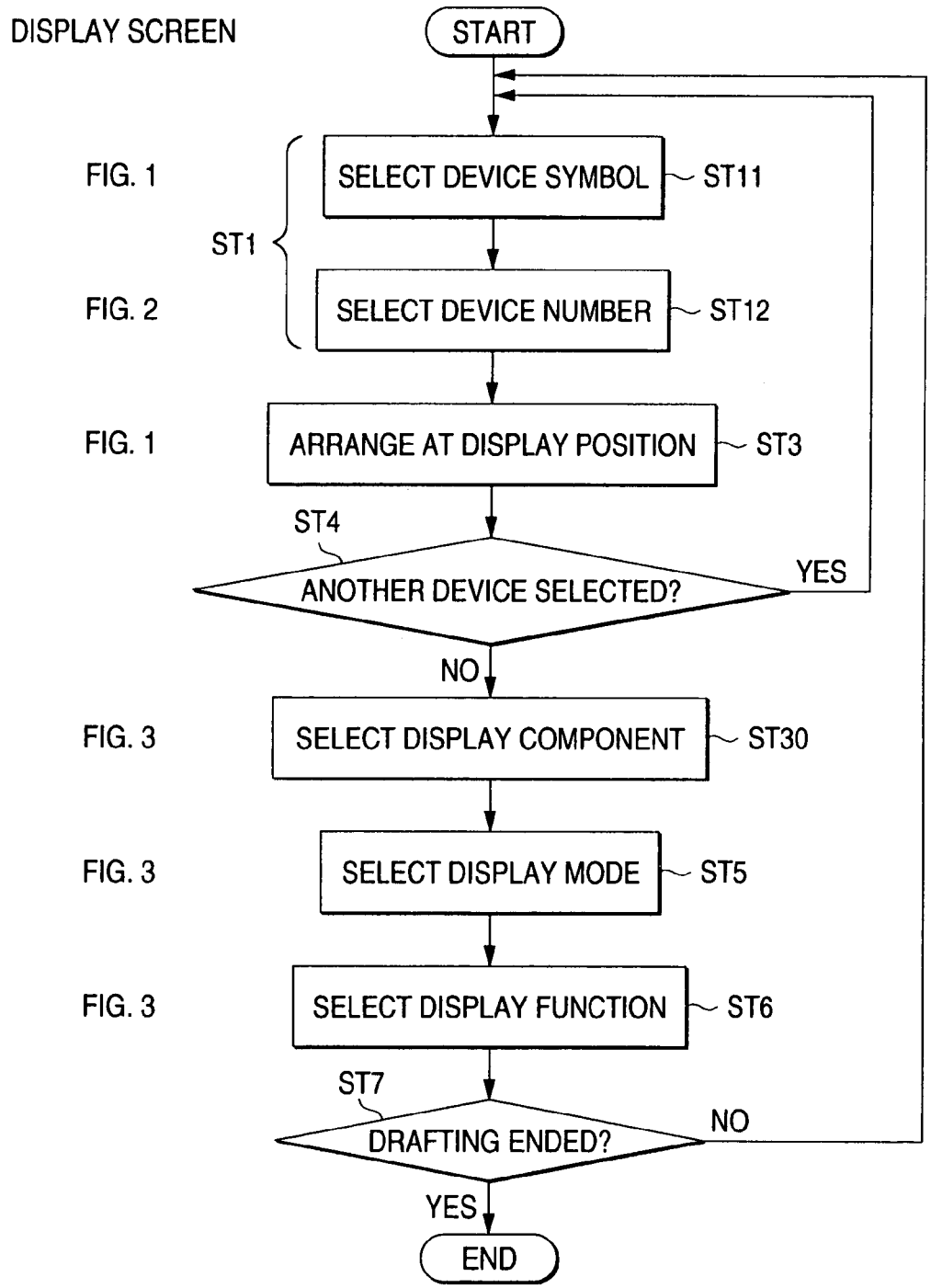
FIG. 4 is a flowchart showing an operation procedure for drafting the display according to the embodiment 1 of this invention.

(1) In FIG. 4, a step ST1 indicates an operation of selecting a predetermined device from among the device selecting means 3 of FIG. 1, using an input unit such as a mouse 1011. For example, when an output signal is selected, a step ST11 can be effected for selection of the device symbol Y by depressing an output Y button 32 with the mouse 1011.

(2) Upon depressing the button 32 for selection of the device symbol, a setting screen of FIG. 2 will appear to effect an operation for selecting the device number on this setting screen at step ST12. If the device number has been input, the screen of FIG. 2 is closed by depressing an OK button 129 as shown in FIG. 2.

(3) The next operation of device selection is a step ST3 where the selected device is arranged at a predetermined display position in the screen 1. The operation of arranging is typically a point operation with the mouse 1011, like ST11, which will occur by pointing to a predetermined position of the screen 1 of FIG. 1 in the device selected state. For example, when a device Y3 is selected at ST1, this is arranged in the device 8 as shown in FIG. 1.

When the fine adjustment for the arranged position after pointing is made, this may be also achieved by making an operation such as a drug and drop operation with the mouse 1011 on the device 8 arranged.

(4) Proceeding to step ST4, it is determined whether or not the next device is selected. When selecting the other device, the routine returns to ST1 to repeat the above procedure. Unless the next device is selected, the routine proceeds to step ST30.

(5) At step ST30, the kind of display component to be assigned to the selected device is selected. This can be effected by using the second display component selecting means 5 of FIG. 3.

(6) If the kind of display component has been decided at ST30, the display modes corresponding to each display component are indicated on the second display mode selecting means 6 to choose a desired one. This operation is made at step ST5.

(7) Then, a step ST6 of selecting the display function is performed with the second display function selecting means 7 for showing the contents corresponding to each display component selected.

Herein, FIG. 3 shows a common setting screen for the operation including a sequence of steps ST30, ST5 and ST6, and shows an instance where a touch key is selected as the display component and a momentary switch is selected as the display function. Opening the setting screen of FIG. 3 is typically effected by an operation to double-click the arranged device 8 of FIG. 1 with the mouse 1011 as the device has been arranged at step ST3.

At ST6, the settings for the device of notice can be completed.

(8) Then, proceeding to a step ST7, it is determined whether or not the drafting operation is completed.

If it is completed, the data of the contents of display drafted is saved with the file in a hard disk 1033 (not shown) and the operation with this apparatus is ended.

If it is not completed at step ST7, the routine returns to ST1 which is the first step in the operation procedure of FIG. 4, to repeat the same operation for the other devices.

In this way, with the embodiment 1, the step of temporarily storing the selected device as conventionally performed can be omitted by starting the drafting from the device selecting step, resulting in the enhanced drafting efficiency.

Embodiment 2

It is an essential portion for explaining the features of the present invention that in the operation procedure of FIG. 4, the step ST1 of selecting the device is placed at the first location of the operation flow, ahead of the step ST30 of selecting the kind of display component. It is not required that the other steps are exactly in the sequential relation as shown in FIG. 4, and performed independently.

In practice, the steps ST5 and ST6 can share the same setting screen format 3 in the embodiment 1 and may be performed in a reverse order to FIG. 4.

Figure 5:
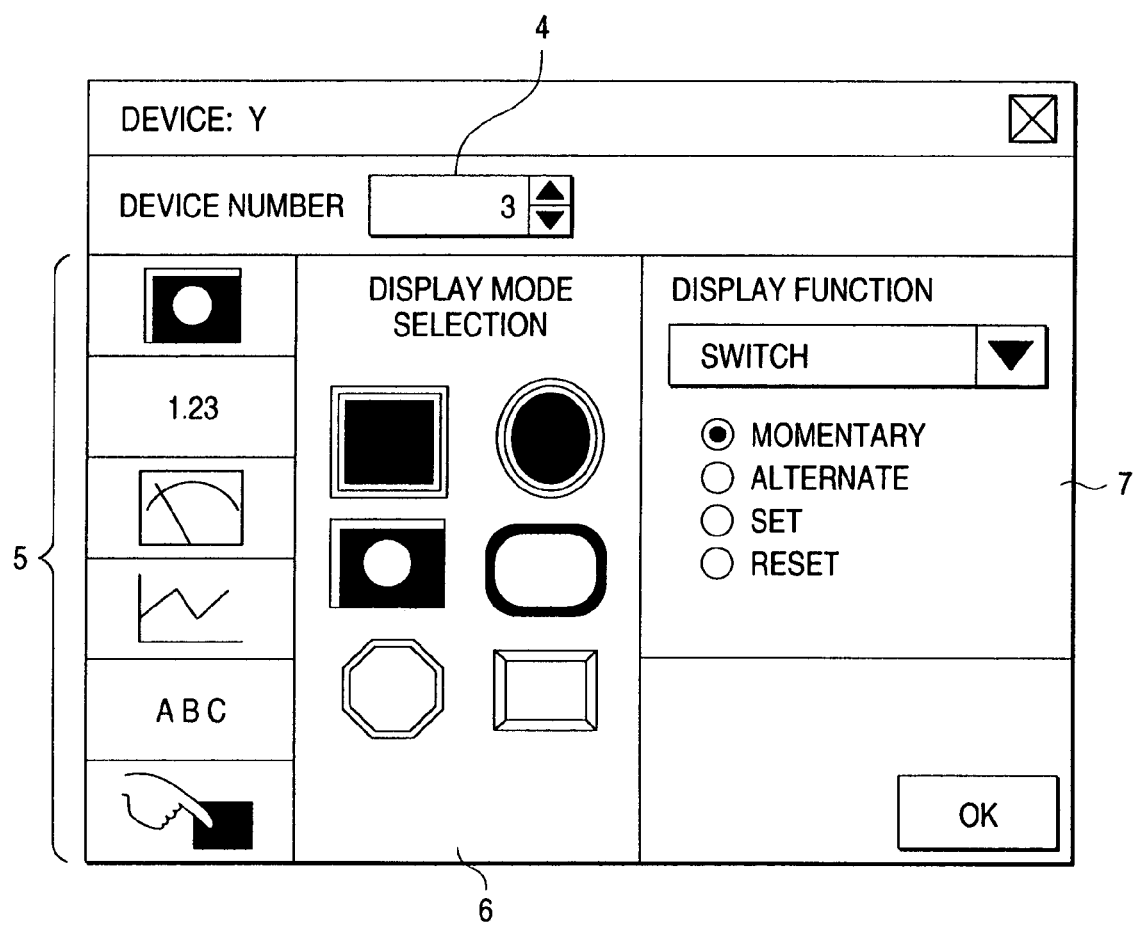
FIG. 5 is a view showing an operation screen of a display drafting apparatus according to an embodiment 2 of this invention.
Figure 6:
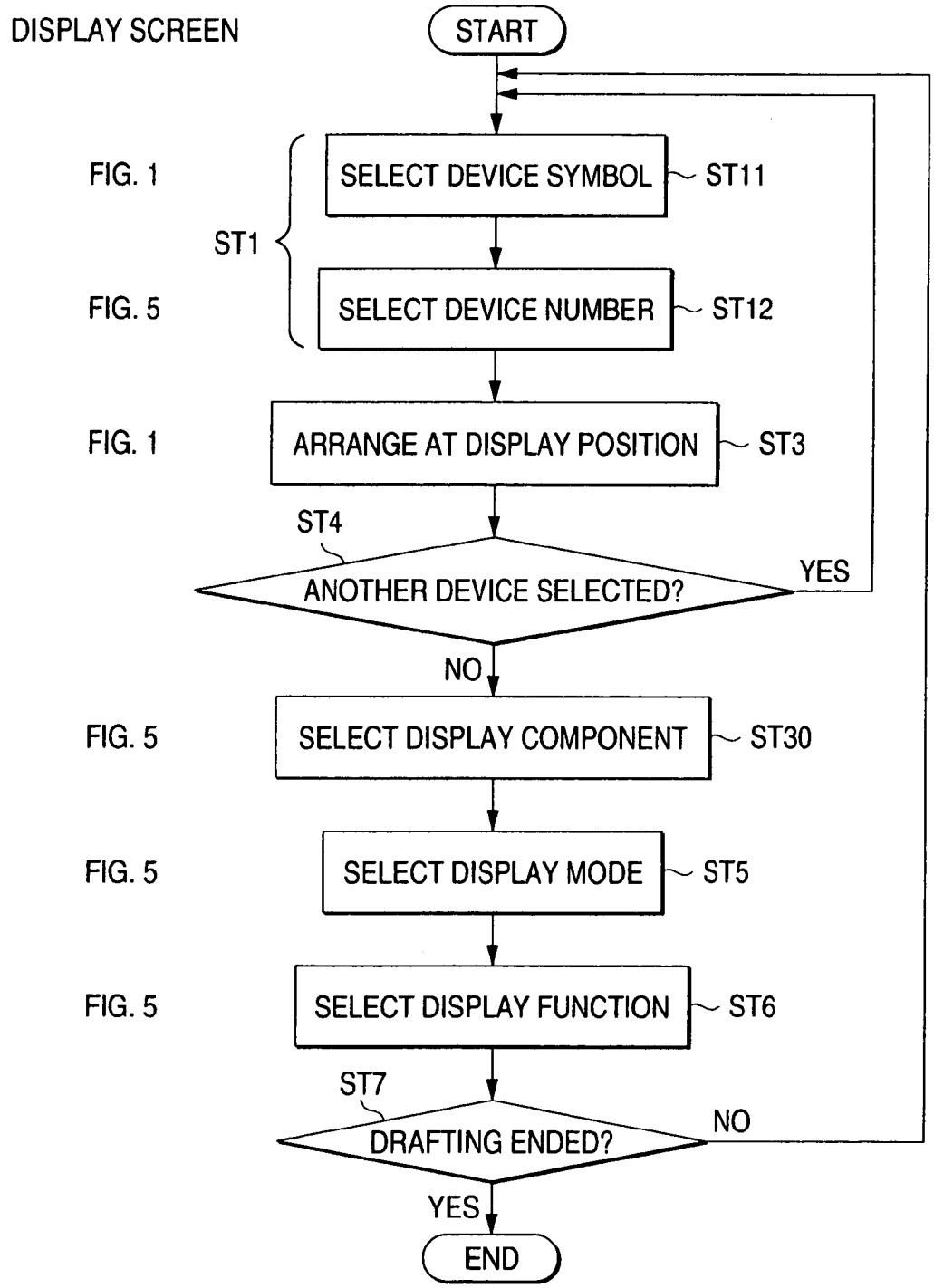
FIG. 6 is a flowchart showing an operation procedure for drafting the display according to the embodiment 2 of this invention.

As shown in a flowchart of FIG. 6, the step ST1 can be divided into a step ST11 of selecting the device symbol and a step ST12 of selecting the device number, wherein a setting screen for ST12 as shown in FIG. 2 may be included within the setting screen format 3 for steps ST30, ST5 and ST6 on the operation screen as shown in FIG. 5.

Figure 7:
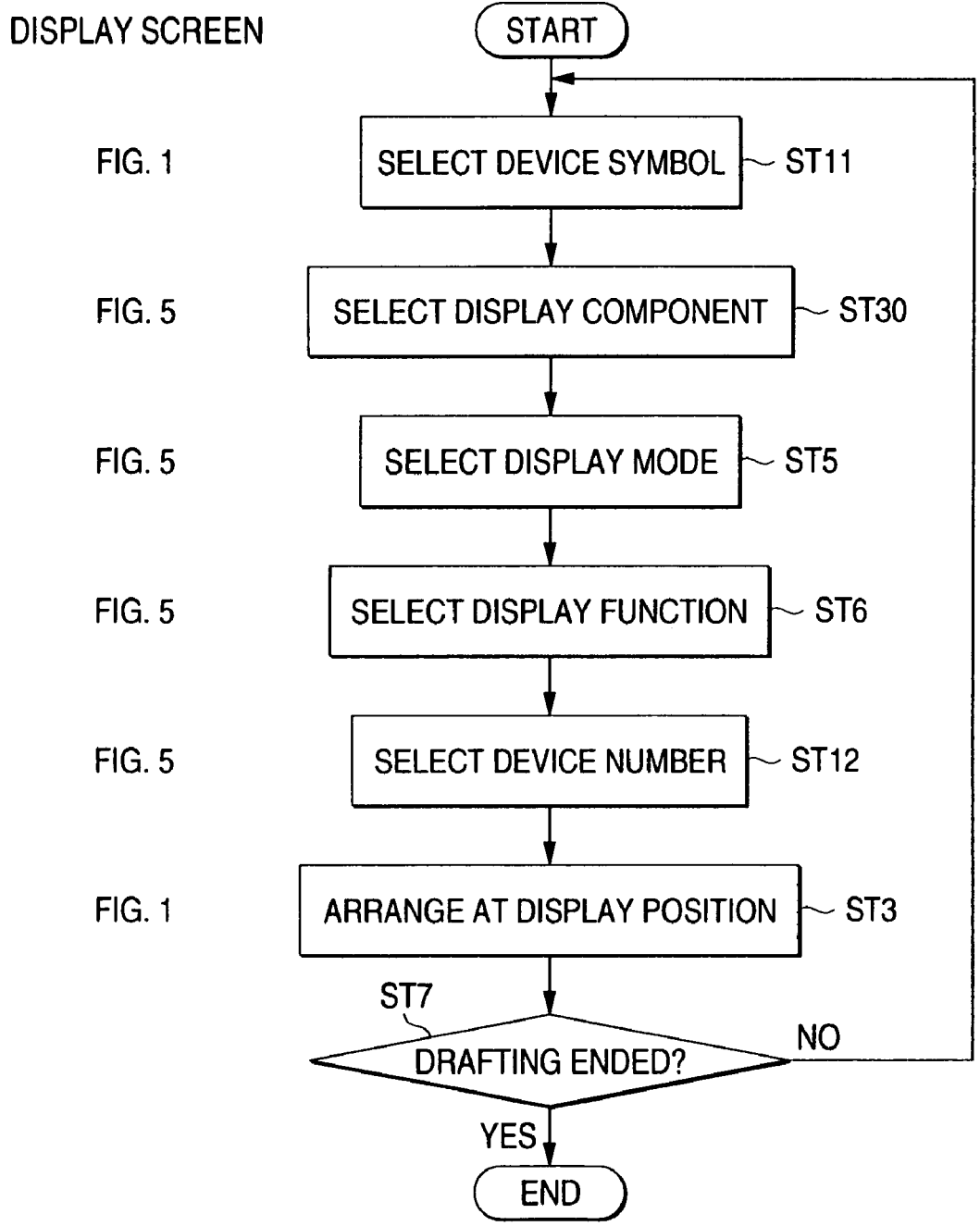
FIG. 7 is a flowchart showing another operation procedure for drafting the display according to the embodiment 2 of this invention.

In this case, after the step ST11 of selecting the device symbol, the designer can perform the step ST12, but in some cases, may perform the steps ST30, ST5 and ST6 as shown in a flowchart of FIG. 7, whereby the operation procedure can be provided with higher degree of freedom than that of the embodiment 1.

Embodiment 3

The setting screen of FIG. 3 in the embodiment 1 may not be prepared specifically, but can be entirely substituted by the setting screen of FIG. 21.

Figure 8:
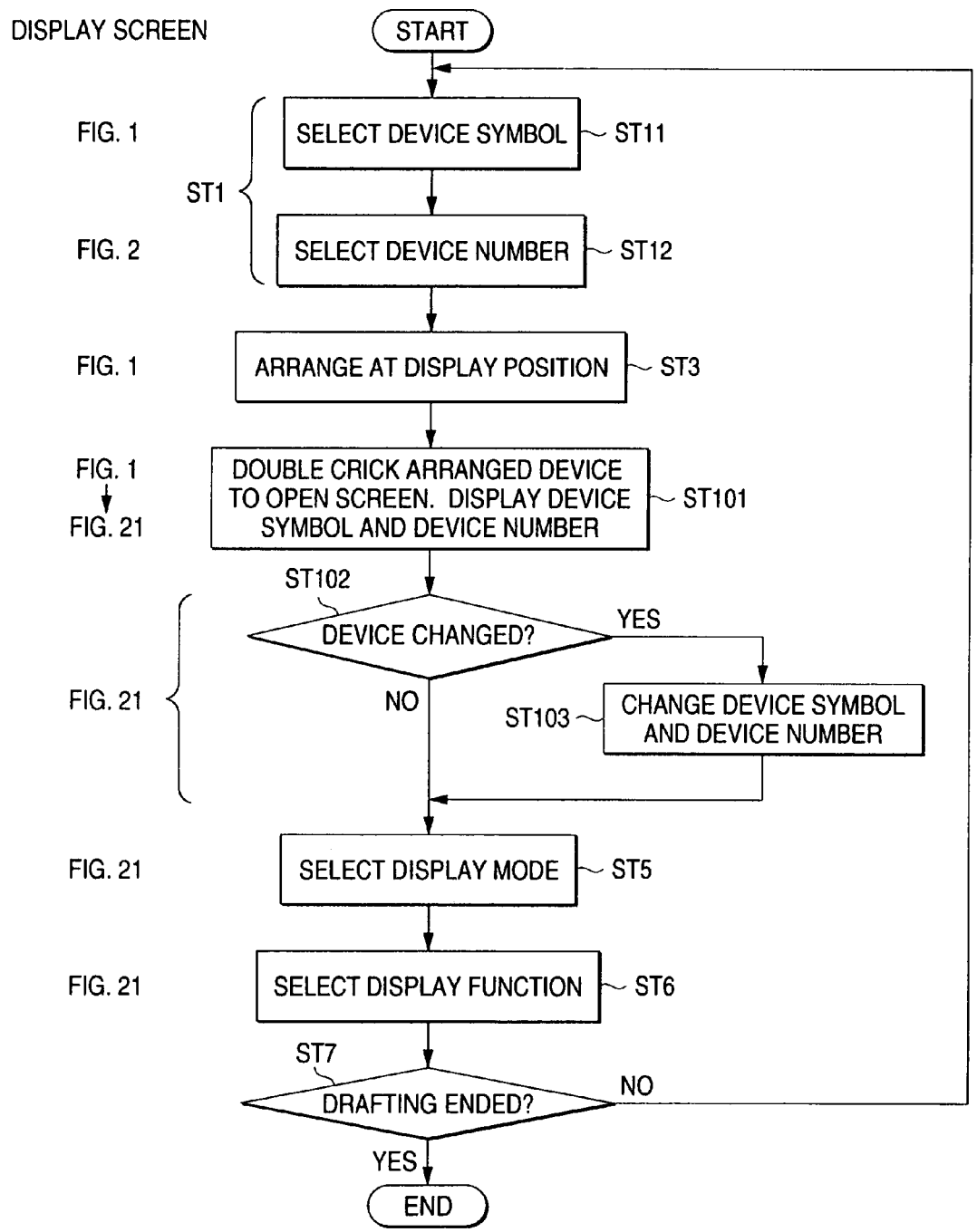
FIG. 8 is a flowchart showing an operation procedure for drafting the display according to an embodiment 3 of this invention.

FIG. 8 shows the relation of the operation screen with the flow in this case, wherein the screen of FIG. 21 can be opened by double-click the arranged device 8 with the mouse 1011 under the condition where a predetermined component is selected by the display component selecting means 2 as shown in FIG. 1, the device 8 being provided firstly at step ST1 consisting of steps-ST11 and ST12 and arranged at step ST3.

In this case, the device symbol and the device number selected at the device selecting step ST1 have been entered into the input areas of the device symbol selecting means 111 and the device number selecting means 112 in FIG. 21, at the same time when the screen of FIG. 21 is opened.

In this embodiment 3, the attribute setting screen of the present invention can be substituted for the attribute setting screen 21 of display component in the conventional procedure to start the drafting with selecting the display component from the display component selecting means 2, as opposed to the embodiment 1, whereby there is the advantage that the constitution of the display drafting apparatus becomes simpler, and the device selected at the device selecting step ST1 can be changed later by the device selecting means 110 of FIG. 21.

The common feature of these embodiments 1, 2 and 3 is to provide the procedure of assigning the display component and setting the display mode and the display function for the device selected by the device selecting means.

Embodiment 4

Figure 9:
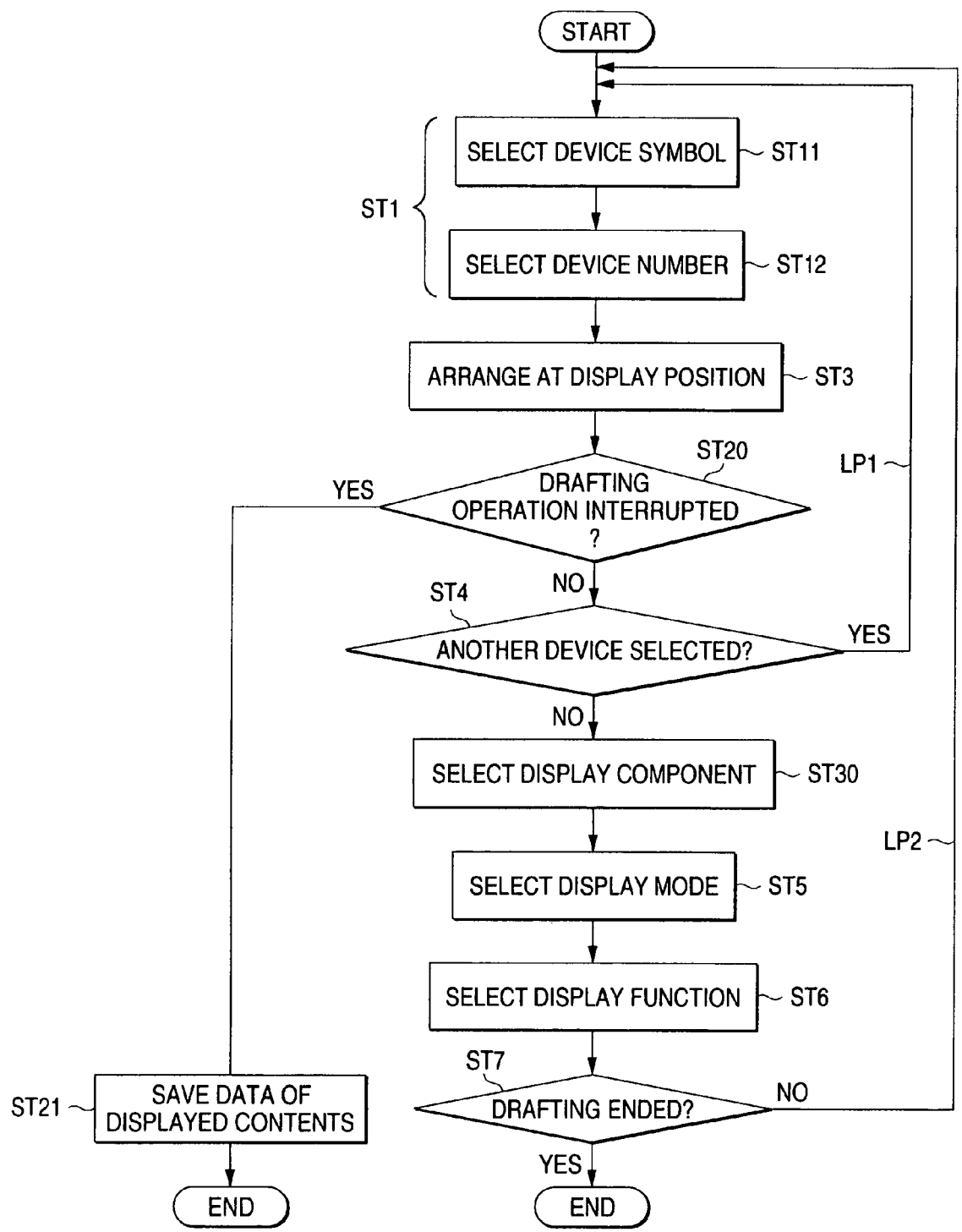
FIG. 9 is a flowchart showing an operation procedure for drafting the display according to an embodiment 4 of this invention.

Referring to FIG. 9, another operation procedure will be described below.

In FIG. 9, the device selecting step ST1 consisting of device symbol selecting step ST11 and device number selecting step ST12, step ST 13 of arranging the device at the display position, step ST4 of judging whether or not to set the other devices, display component selecting step ST30, display mode selecting step ST5, display function selecting step ST6, and drafting end judging step ST7 are the same as those described in the previous embodiment 1. In this embodiment 4, a step ST20 of judging whether or not to interrupt the drafting operation to save the data is newly added.

In the case where it is determined that the drafting operation is interrupted at ST20, the drafting operation can be ended through a step ST21 of saving the data of displayed contents at the interrupted stage. Herein, step ST20 can be placed at any location in FIG. 9 as far as it is within a loop LP1. Since the setting contents required for the operation within the loop LP1 is only concerned with the device, the drafting operation within the loop LP1 can be only forwardly performed even at the stage where other specifications including the display mode and the display function than the device have not been decided among the specifications required for the display.

Also, in the cases where the display mode and the display function have been decided for a portion of the device, the repetitive procedures for loop LP1 and loop LP2 may be combined to effect forwardly all the settings that have been decided.

In this way, if the drafting operation is interrupted halfway, the data of displayed contents may contain the information including only the device selected but not the kind of display component, the display mode and the display function.

Figures 10, 11:
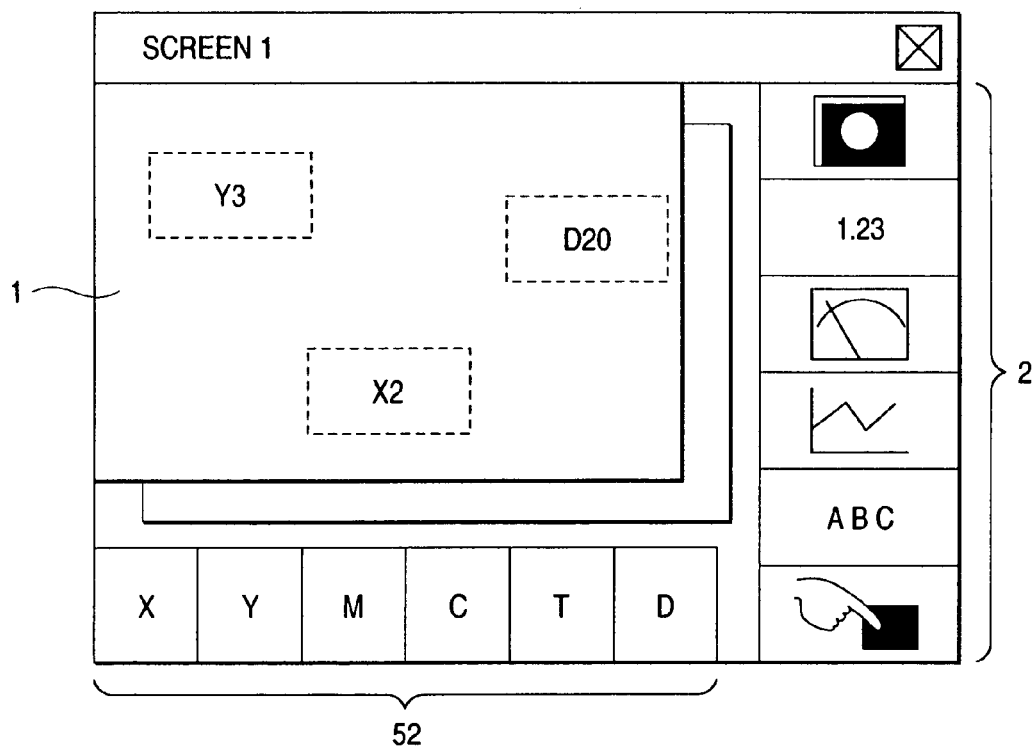
FIG. 10 is a diagram showing the data structure of constructional elements for the display according to the embodiment 4 of this invention.
FIG. 11 is a view showing an operation screen of a display drafting apparatus according to an embodiment 5 of this invention.

FIG. 10 shows the data structures of constructional elements constituting the display contents, in which the kind of display component, the display mode and the display function are reserved. In FIG. 10, hexadecimal digit FFFF, for example, is set as a value for indicating the reserved state in the memories 40, 41, and 42 to store the reserved preset parameters. Another method of indicating the reserved state is that the apparatus itself provides a temporary initial value (default value) without the user explicitly setting up the value, and such a method may be also usable in this embodiment.

In this way, since in the embodiment 4 the drafting operation can be interrupted to save the drafting data containing only the information regarding the selection of device, after making the device selecting step, and before completing the selection of display component as well as the selection of display mode and display function, the drafting operation can be started by forwardly effecting the step of assigning the device even at the stage where the specifications of display component for the display have not been decided, whereby there is the enhanced drafting efficiency.

Embodiment 5

Figure 12:
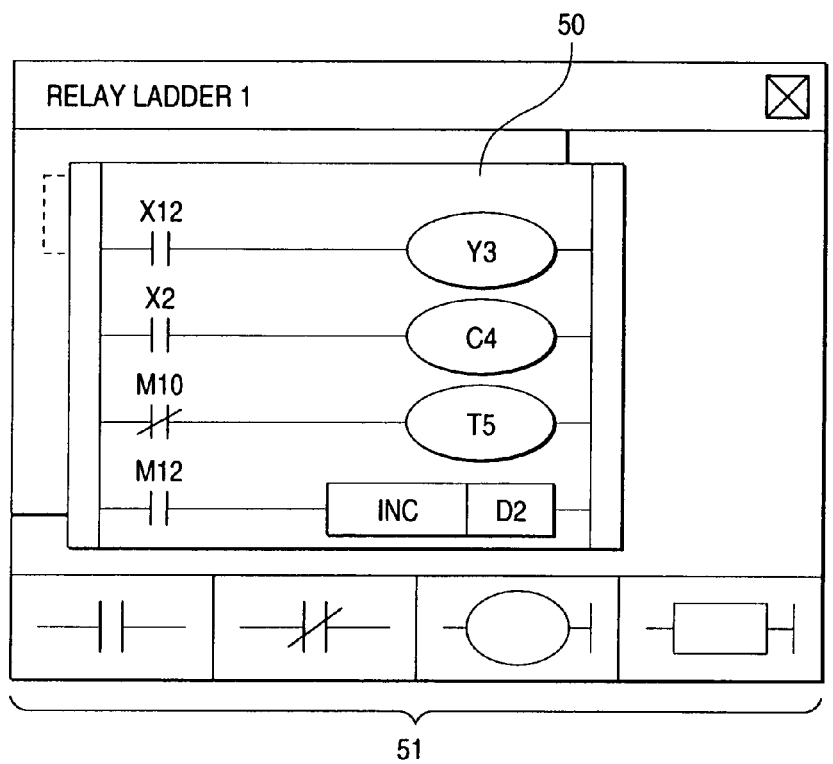
FIG. 12 is a view showing an operation screen for sharing with the control program schema generator the device selection in the display drafting apparatus according to the embodiment 5 of this invention.

FIGS. 11 and 12 show the user operation screens in another embodiment 5. An apparatus of this embodiment simply has the function as the display drafting apparatus and the function as the control program schema generator within one unit, wherein the CPU 105 with the basic constitution of FIG. 19 uses a multitask processor, and the basic OS uses a multitask OS. FIG. 11 is a user operation screen of the display drafting apparatus, and FIG. 12 is a user operation screen of the control program schema generator, wherein a method of displaying these two user operation screens on the same display unit typically relies on a multi-window, which is also optimum for this embodiment.

In FIG. 11, reference numeral 1 denotes a drafting area indicating the display screen, and reference numeral 2 denotes selecting means of the display component, which can discharge the same duties as those of FIG. 1. In FIG. 12, reference numeral 50 denotes a screen for creating the sequence diagram of the control program schema generator, and reference numeral 51 denotes means of selecting the sequence circuit symbol for use to input the sequence diagram into the screen 50.

In FIG. 11, reference numeral 52 denotes device selecting means in the display drafting apparatus, which is also usable as selecting means of the device to be given to a circuit symbol which has been input into the sequence diagram screen 50 using the sequence circuit symbol selecting means 51. The user operating the display drafting apparatus selects a device of notice using the device selecting means 52 of FIG. 11, and then switches the apparatus of interest for operation into the control program schema generator. Thereafter, if a sequence circuit symbol for input is selected by the sequence circuit symbol selecting means 51 of FIG. 12, the device which has been selected by the device selecting means 52 is assigned with its sequence circuit symbol.

Figure 13:
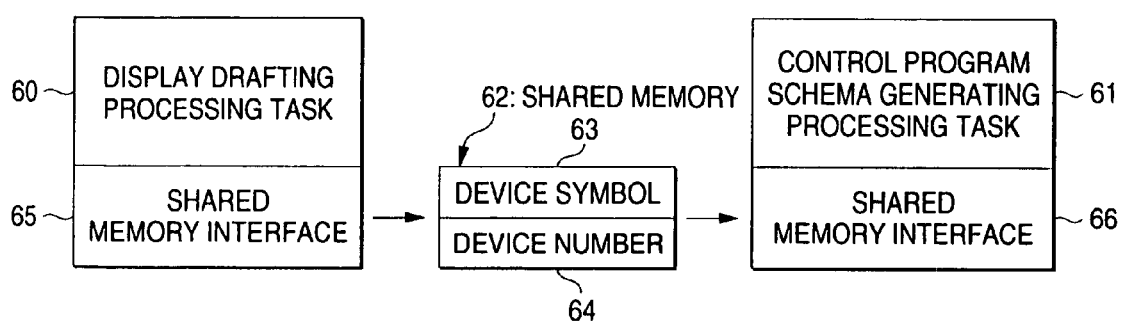
FIG. 13 is a diagram showing the way of conveying the device selection information from the display drafting apparatus to the control program schema generator according to the embodiment 5 of this invention.

Herein, the device selection information in the display drafting apparatus includes the device symbol and the device number, but in order to convey the device symbol and the device number to the processing tasks for the control program schema and the display drafting in the multitask system of this embodiment, communication may be made between both tasks, or a shared memory may be provided to share data. FIG. 13 shows a mechanism wherein the shared memory 62 is provided between a display drafting processing task 60 on the display drafting apparatus and a control program schema generator processing task 61, to communicate the selection information of a device symbol 63 and a device number 64 between both tasks. Herein, reference numeral 65 denotes interface means between the display drafting processing task 60 and the shared memory 62, and reference numeral 66 denotes interface means between the control program schema generating task and the shared memory 62.

Embodiment 6

Figure 14:
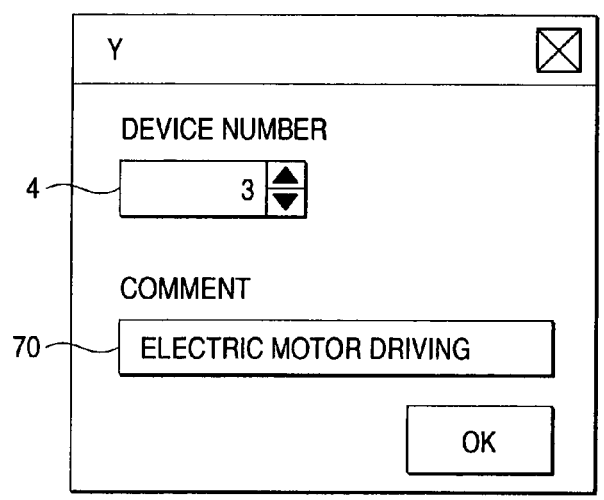
FIG. 14 is a view showing a screen of comment appending means according to an embodiment 6 of this invention.

FIG. 14 shows means 70 for appending a comment to the selected device, which is additionally provided to means 4 for setting the device number to the selected device as shown in FIG. 2 in the embodiment 1.

The comment for Y3 as shown in FIG. 14 is appended as "Driving electronic motor". Besides, the examples of comment include "X0: START", "X1: STOP", "Y2: Electric motor rotating" and so on.

Figure 15:
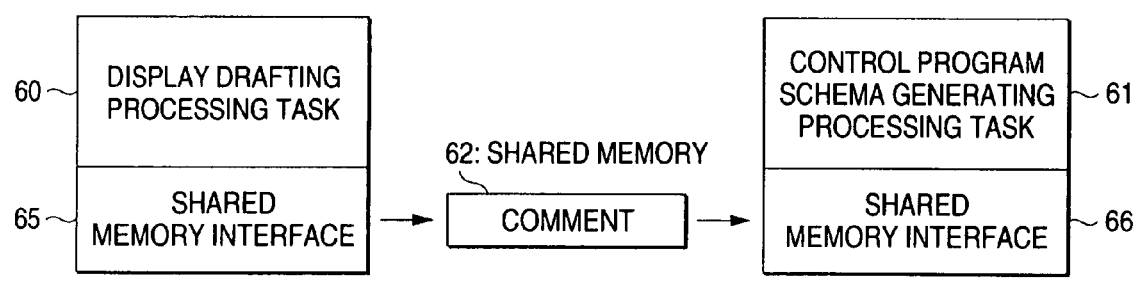
FIG. 15 is a diagram showing the way of conveying the comment according to the embodiment 6 of this invention.

If the comment is appended to the device in this way, the duty of the device may be clearly seen, or the designer can make use of a label which is easier to understand than the device symbol and the device number. This comment appending means is likewise provided in the control program schema generator, and a mechanism of FIG. 15 is to convey a comment created by the display drafting processing task in the multitask system to the control program schema generating task, using the shared memory, like the embodiment 5.

Embodiment 7

In the examples 5 and 6, there was described means for sharing the device symbol, the device number and the comment via the shared memory between the control program schema generating processing task and the display drafting processing task in the multitask system. To use this shared memory, it is required to provide interface means with the shared memory for two tasks, as shown in FIGS. 13 and 15, resulting in a complex system as the whole. The present embodiment 7 is to provide the display drafting processing task and the control program schema generating processing task as one task having both processing functions, without providing them separately, as shown in FIG. 16, wherein a control program schema generating process and a display drafting process 80 can hold the device information in a same working memory 81, which makes it possible to uniformly manage the setting data with a simple constitution.

It should be noted that means for appending the comment to the selected device in the embodiment 6 is also applicable to the embodiment 7.

Figure 16:
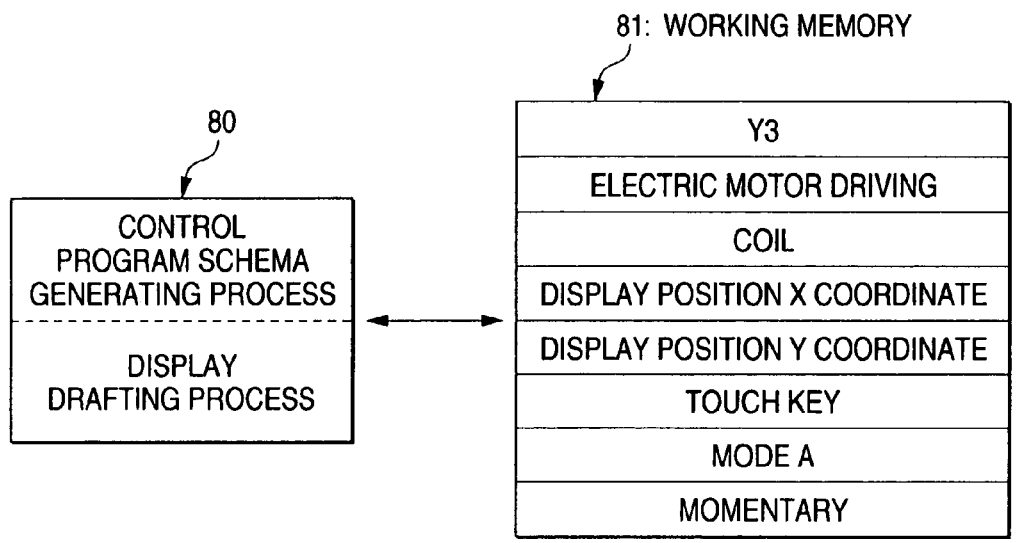
FIG. 16 is a diagram for explaining means for uniformly managing the setting data according to an embodiment 7 of this invention.

This is achieved by containing common comment appending means within the control program schema generating process and the display drafting process 80 of FIG. 16, the created comment being shared between the control program schema generating process and the display drafting process.

Also, the control program schema generating process and the display drafting process each may contain comment appending means, in which a comment created by any comment appending means may be shared for both processings.

Embodiment 8

While the display drafting apparatus which provides the control program schema generating process and the display drafting process in the same apparatus was illustrated in the embodiment 7, this apparatus is required to transfer the control program data created to the controller and the drafting data to the display.

Figure 17:
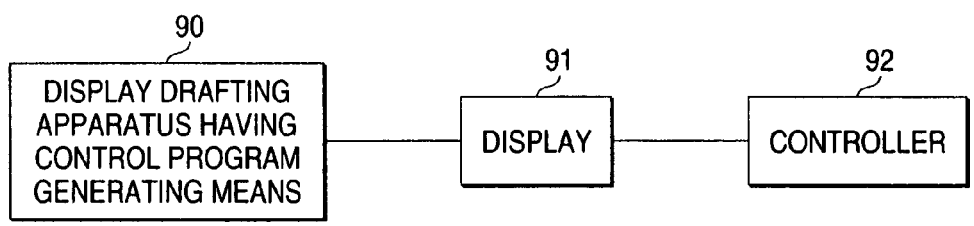
FIG. 17 is a block diagram showing a display drafting system according to an embodiment 8 of this invention.

FIG. 17 shows the connection form for transferring the data from one display drafting apparatus 90 to two units of interest consisting of a controller 92 and a display 91, the display drafting apparatus 90 being directly connected to the display 91. Further, the display 91 is connected to the controller 92, the connection between the display drafting apparatus 90 and the controller 92 being made via the display 91 interposed between them.

Figure 18:
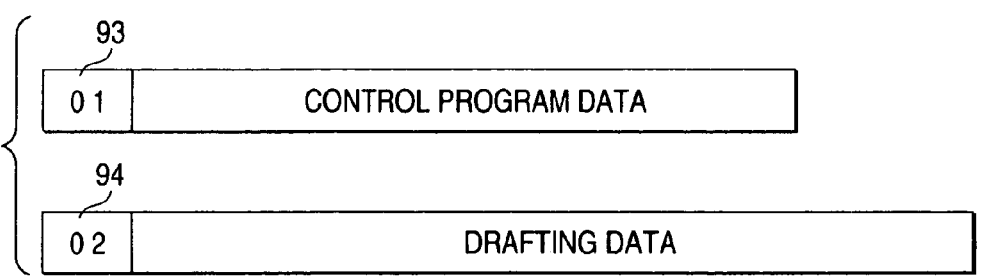
FIG. 18 is a diagram of the data structure transferred by the display drafting apparatus according to the embodiment 8 of this invention.

FIG. 18 shows a transfer data format of control program data which is transferred to the display 91 by the display drafting apparatus 90. The control program data has a control program identifier element 93 appended to allow the display 91 to easily identify the control program. The drafting data has an identifier element 94 appended to identify the drafting data.

In an example as shown in FIG. 18, the control program identifier element has hexadecimal 01 and the drafting data identifier element has hexadecimal 02. The display 91 can pass the control program data transferred from the display drafting apparatus 90 to the controller 92 at later stage and get the drafting data into the display 91, in accordance with these identifier elements.

This embodiment 8 can provide the display drafting apparatus which is easy to perform the transfer operation by omitting the interface and the cable for connection between the controller 92 and the display drafting apparatus 90, to effect the easy connection between the display and the controller, and omitting the operation to designate whether or not the designer operating the display drafting apparatus 90 specifies the display or the controller as the destination of transfer.

This embodiment 8 has the following specific merits.

(1) In the cases where the display and the controller are disposed relatively closely, and both the display and the controller are far away from the display drafting apparatus, it is sufficient to have only one long connecting cable to connect them.

(2) In operation, the display and the controller are connected, the display drafting apparatus and the display are connected via a connecting cable at the time of drafting, creating a program or making the maintenance, and its connecting cable is removed at the end of maintenance. Accordingly, this operation involves attaching or detaching one connecting cable, and can be easily performed.

(3) In the cases where the display drafting processing task and the control program schema generating processing task are not provided separately, but provided as one task having both processing functions, like the embodiment 7, only one communication means may be provided within the display drafting apparatus, to transfer the drafting data or control program data created by this task to the display and the controller. Further, since both processing functions never contend for one communication path at the same time, the communication means can be simplified without need of performing the exclusive control.

In FIG. 17, it will be understood that the data may be sent via the communication line from the display drafting apparatus 90 to the controller 92, and from the controller 92 to the display 91. In this case, the interface for connection and the connecting cable between the display drafting apparatus 90 and the display 91 can be omitted, and the data transfer format of FIG. 18 can be utilized.

Also, the display drafting apparatus 90, the display 91 and the controller 92 may be connected via an interconnecting network. In this case, the data transfer format of FIG. 18 may be also used.

It should be noted that the communication line is not limited to the wire, but may be wireless.

As a variation, any of the display drafting apparatuses described in the embodiments 1 to 7, and the control program schema generator for the controller as conventionally used, are connected via the communication line such as a network to constitute a system to share the created information.

The device selection information of the controller selected and created by device selecting means of the display drafting apparatus, or the device selection information of the controller selected and created by the control program schema generator are sent or received via the telecommunication circuit to share the sent or received information.

Each of the display drafting apparatus and the control program schema generator is provided with comment appending means for appending the comment to the selected device of the controller, the comment being appended to the selected device of the controller, whereby this comment information can be sent or received via the communication line to share the sent or received information.

It should be noted that when a plurality of display drafting apparatuses are connected to the network, the created information may be shared between the display drafting apparatuses.

The communication line is not limited to the wire, but may be wireless.

In this way, with this variation, necessary information can be shared, even if it is a long distance between the display drafting apparatus and the control program schema generator, or between the display drafting apparatuses.

(1) A display drafting apparatus according to aspect 1 of the invention can start drafting with the selection step of a device, making it possible to omit the step of temporarily storing the selected device, resulting in enhanced drafting efficiency.

(2) The display drafting apparatus according to aspect 2 of the invention can start drafting by forwardly effecting the step of assigning the device even at the stage where the specifications of the display component for the display have not been decided, owing to the provision of means for storing only the device selection information of the controller, resulting in enhanced drafting efficiency.

(3) The display drafting apparatus according to aspect 3 of the invention allows the device selection information selected and created by the device selecting means to be utilized with the control program schema generator, resulting in enhanced design efficiency of the control program schema.

(4) The display drafting apparatus according to aspect 4 of the invention allows a comment appended to the device to be also utilized with the control program schema generator, resulting in enhanced design efficiency of the control program schema.

(5) The display drafting apparatus according to aspect 5 of the invention provides the control program schema generating means in the display drafting apparatus, so that the setting data dealt with by both the control program and the drafting can be uniformly managed with a simple constitution.

(6) A display drafting system according to aspect 6 of the invention can facilitate the connection between the display drafting apparatus, the controller and the display, and the transfer of the display drafting data created and the control program.

What is claimed is:

1. A display drafting method comprising:
   selecting a signal or data of a controlled system, where the signal or the data is stored in a memory of a controller and the controller controls operations of the controlled system; and
   setting up a display drafting information for said selected signal or data after said signal or data is selected,
   wherein said selected signal or data is used in display drafting and in a design of a control program for said controller, the design of a control program is performed separately from the display drafting,
   wherein the control program for the controller is designed using a ladder diagram, and
   wherein the selected signal or data is stored in a shared memory accessible to both the control program and the display drafting program.

2. The display drafting method according to claim 1, wherein said selecting the signal or data further comprises selecting a signal or data symbol and selecting a signal or data number.

3. The display drafting method according to claim 1, wherein said setting up the display drafting information further comprises setting up a display component, display mode and display function.

4. The display drafting method according to claim 2, further comprising changing at least one of said signal or data symbol and said signal or data number after setting up part of said display drafting information.

5. The display drafting method according to claim 1, further comprising interrupting said setting up the display drafting information to save data of said display drafting information.

6. The display drafting method according to claim 1, further comprising interrupting said selecting of signal or data to save data of said signal or data selection information.

7. The display drafting method according to claim 1, wherein the signal or data is one of an input signal, an output signal, an auxiliary signal, a count value, a timer value, and a numerical data of a controlled system, the programmable controller is configured to control the operation of the controlled system.

8. A display drafting method comprising:
selecting a signal or data of a controlled system, where the signal or the data is stored in a memory of a controller and the controller controls operations of the controlled system; and
setting up a display drafting information for said selected signal or data after said signal or data is selected,
wherein the signal or data is one of an input signal, an output signal, an auxiliary signal, a count value, a timer value, and a numerical data of a controlled system, the controller is configured to control the operation of the controlled system, and
wherein the controlled system is a production line, and
wherein said selected signal or data is used in display drafting and in a design of a control display drafting.

* * * * *